May 16, 1933.  F. W. GARRISON  1,908,974
THREAD CUTTING ATTACHMENT AND MACHINE
Filed Aug. 4, 1927  4 Sheets-Sheet 1

INVENTOR

May 16, 1933.  F. W. GARRISON  1,908,974
THREAD CUTTING ATTACHMENT AND MACHINE
Filed Aug. 4, 1927  4 Sheets-Sheet 4

INVENTOR
Fred W. Garrison,
by Byrnes, Stebbins & Parmelee
his atty.

Patented May 16, 1933

1,908,974

UNITED STATES PATENT OFFICE

FRED W. GARRISON, OF MILLVILLE, NEW JERSEY, ASSIGNOR TO WHITALL-TATUM COMPANY, OF MILLVILLE, NEW JERSEY, A CORPORATION OF NEW JERSEY

THREAD CUTTING ATTACHMENT AND MACHINE

Application filed August 4, 1927. Serial No. 210,522.

The present invention relates broadly to the art of producing threads, and more particularly to an improved attachment suitable for lathes and other metal working machines, whereby the cutting of threads of the desired characteristics and of greater accuracy is facilitated.

In many arts it is necessary to provide metal bodies with internal threads of a wide variety of shapes, pitches and characteristics. Such conditions obtain, for example, in the glass working industry, in the manufacture of molds suitable for the formation of the threaded necks on bottles, jars, or other glass receptacles.

Not infrequently, due to the limitations of mold structures, it is necessary to provide an accurate thread which is spaced axially from one extremity of the mold, thereby necessitating the cutting of a thread which commences and terminates without intersecting an end-face of the body in which it is formed. The production of such threads with ordinary cutting tools has presented an extremely difficult problem by reason of the necessity of constantly repeating the cut due to the limitations with respect to metal removal during each cutting operation, and also by reason of the difficulty of starting a thread having the desired depth at the starting point.

The present invention aims to provide in effect an attachment in the form of a milling machine adapted to be applied to lathes or other metal working machines for enabling the production of either external or internal threads of any desired characteristics, or the production of interrupted threads, with ease and accuracy.

In the accompanying drawings there is shown, for purposes of illustration only, a preferred embodiment of the present invention, it being understood that the drawings do not define the limits of the invention as changes in the construction and operation disclosed therein may be made without departing from the spirit of my invention or the scope of my broader claims.

In the drawings,—

Figure 1:
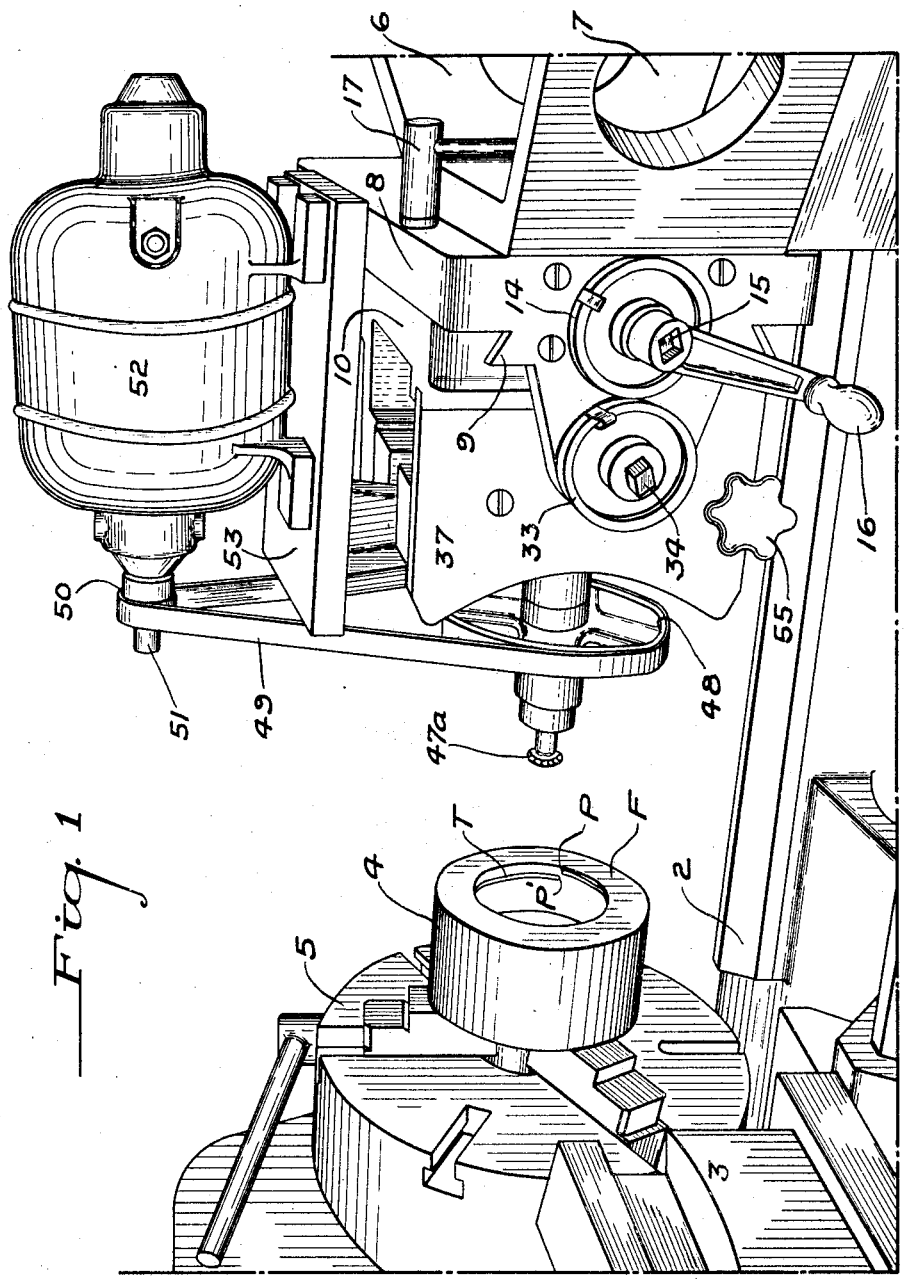
Figure 1 is a perspective view of a portion of a metal working machine showing in position an attachment in accordance with the present invention.

In carrying out the present invention, which is obviously adapted for application to machines of a wide variety of kinds and types, it is desirable, in order to obtain the flexibility of operation required, to provide separate driving means for the attachment. In Figure 1 of the drawings there is illustrated a portion of a lathe having the usual bed-plate 2 and tool carrying carriage 3 for cooperation with work 4 carried by chuck 5, rotated in any desired and well known manner.

Also carried by the machine is a turret 6 of any desired construction to one of the faces of which there is secured an attachment in accordance with the present invention.

Figure 2:
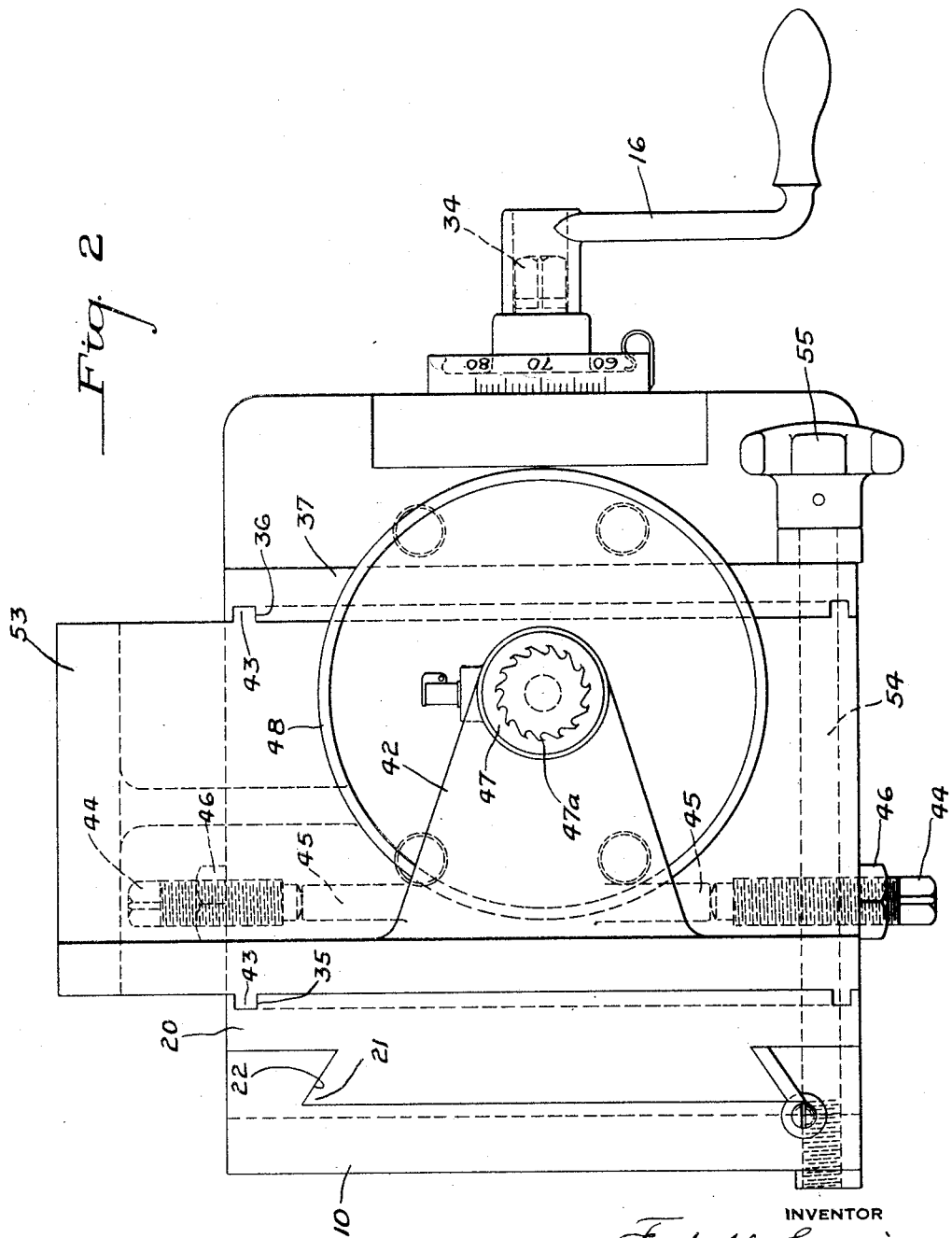
Figure 2 is an end elevation of the attachment shown in Figure 1.
Figure 3:
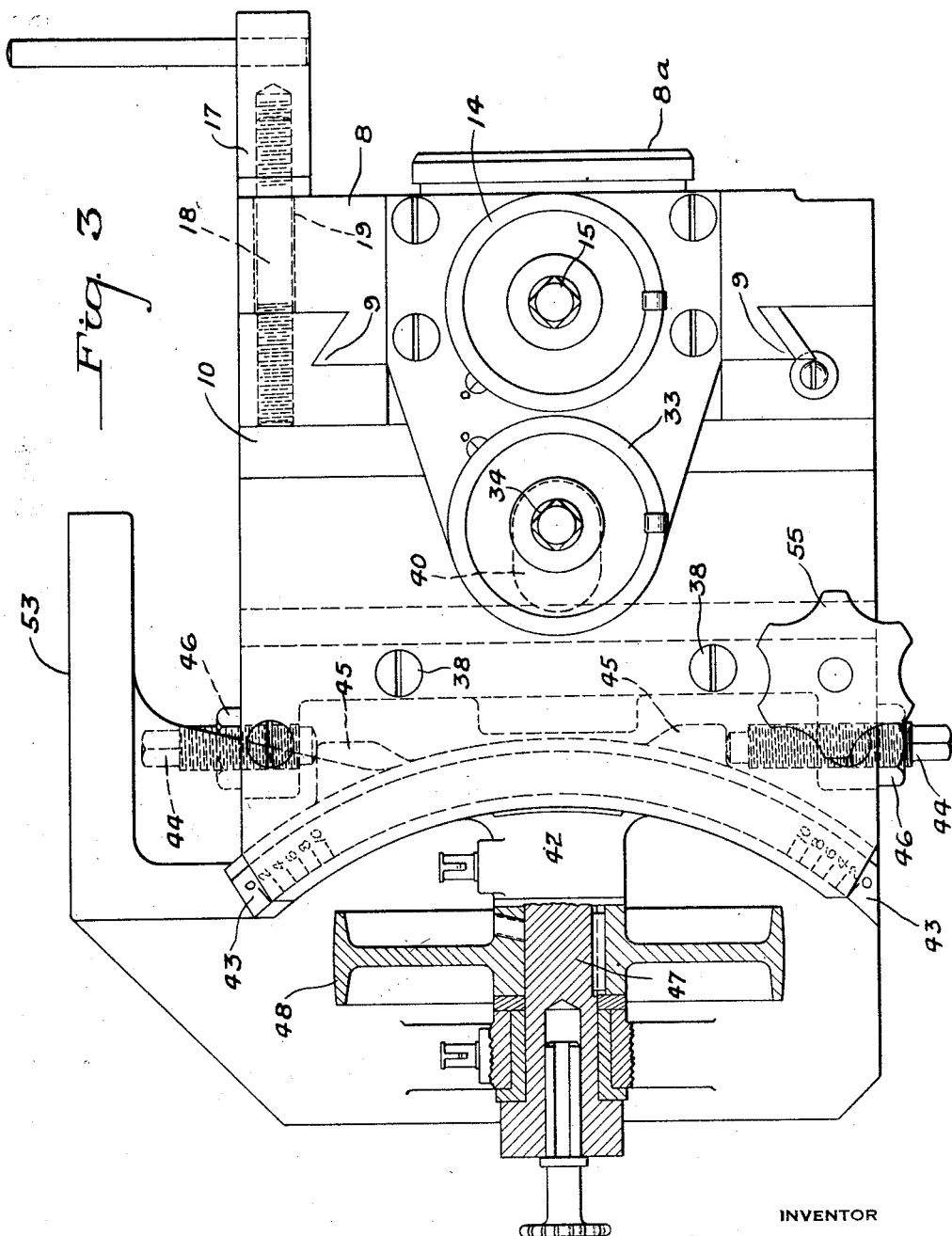
Figure 3 is a side elevational view, partly broken away and partly in section of the attachment.

The turret is shown as having one or more of its faces provided with openings 7, and the attachment is illustrated as comprising a plate 8 having a centering projection 8a thereon adapted for cooperation with one of the openings 7, the plate 8 being otherwise clamped in position on the turret in any desired manner. The plate 8 is formed with a dovetailed projection 9 on which is adapted to slide a carriage 10, preferably in the form of an angle-plate, as illustrated in section in Figure 4. For obtaining movement of the carriage 10 relatively to the plate 8 there may be provided a feed-screw 11 having a threaded engagement with a nut 12 secured to the carriage. The screw 11 may be provided with a suitable thrust collar or bearing 13 beyond which the screw is extended to form an attaching portion for a calibrated dial 14 and a squared portion 15 for the attachment of a hand-crank 16, as illustrated in Figures 1 and 2. Upon rotation of the feed-screw in one direction or the other, it will be apparent that the carriage 10 may be moved laterally along the projection 9. When it has reached the desired position the parts may be clamped by a suitable clamping-nut 17 cooperating with a bolt 18 extending through an elongated slot 19 in the plate 8. In addition to the transverse movement of the carriage relatively to the plate 8, it is also desirable to provide for movement in a direction substantially normal to the face of the plate. Such movement is obtainable by reason of the provision of a slide 20 having a dovetailed projection 21 engaging a correspondingly shaped groove 22 in one face of the carriage 10. For obtaining movement of the slide 20 in the direction referred to, it may be provided with a nut or bushing 23 internally threaded for cooperation with the screw 24 provided on one end with a thrust-bearing or collar 25, and at an intermediate portion with a bevelled-gear 26. Meshing with the bevelled-gear 26 is a similar gear 27 on a shaft 28 rotatably mounted in a bearing 29 projecting from the carriage 10. Due to this construction, the gears 26 and 27 are maintained in continuous operative engagement. For operating the shaft 28 irrespective of the position of the carriage 10 on the plate 8, there is provided a second shaft 30 having a tubular extension 31 telescopically cooperating with the shaft 28 and suitably splined thereto, as for example, by the provision of a key 32. The shaft 30 is constructed at its outer end similarly to the screw 11 to provide a mounting for dial 33, and to provide a squared portion 34 for engagement with a crank. Upon rotation of the shaft 30 in one direction or the other, it will be apparent that the screw 24 will be correspondingly rotated to thereby either advance or retract the slide 20.

The construction this far described provides a movement in either of two directions along axes at substantially right angles to each other, thereby permitting adjustment of the slide 20 toward or from the work 4 in a direction generally axially thereof, and another movement of the carriage 10 in a direction substantially radially of the work.

Formed in one face of the slide 20 is an arcuate groove 35, a similar groove 36 being formed in a face-plate 37 secured to the slide in any desired manner, as for example, by means of the bolts 38. The slide 20 is provided with an extension 39 in which is formed an elongated slot 40 straddling the tubular extension 31. The face-plate is supported from the carriage 10 for sliding movement relatively thereto by reason of a slide-way 41.

Cooperating with the grooves 35 and 36 is a tool-head 42 having oppositely disposed arcuate projections 43 slidably mounted in the grooves. Relative movement between the tool-head and slide 20 is obtainable by means of adjusting screws 44 cooperating with lugs 45 on the tool-head, the adjusting screws 44 being held in adjusted position by jam-nuts 46.

Journaled in the tool-head 42 is a tool-arbor 47 carrying a tool 47a at its outer end. The arbor 47 may have secured thereto a driving-pulley 48 for cooperation with a driving-belt 49 extending around a pulley 50 on the armature shaft 51 of a motor 52. To maintain at all times a predetermined relation between the pulleys 50 and 48, the tool-head 42 is provided with a motor receiving pad 53. By reason of this construction any adjustment of the tool-head produces a corresponding adjustment of the motor.

Figure 4:
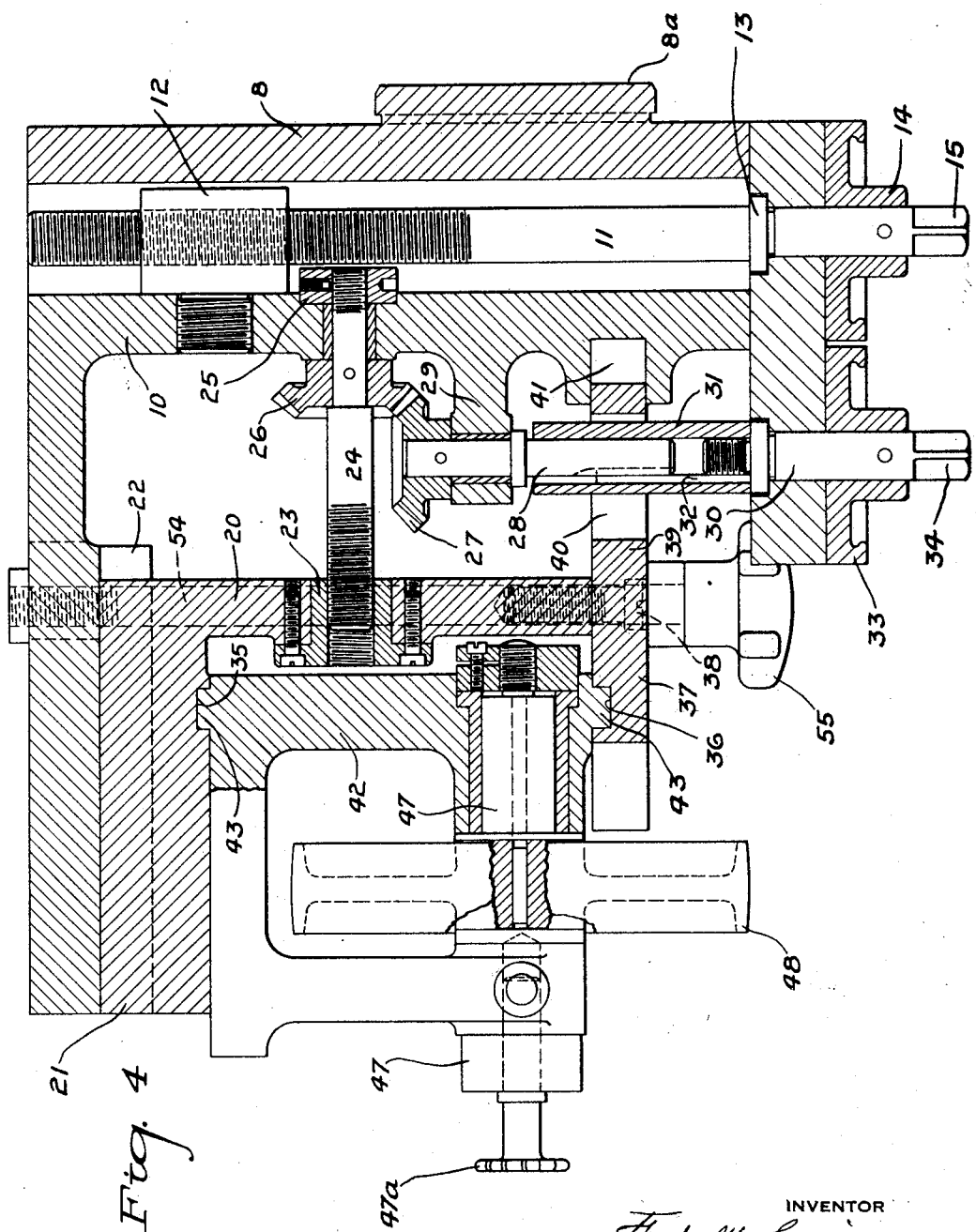
Figure 4 is a horizontal combined sectional and elevational view with certain of the parts broken away, and illustrating in detail the means for obtaining certain of the adjustments required for the operation of the attachment.

Extending transversely through the face-plate 37 and through the carriage 10 may be a clamping bolt 54, illustrated in dotted lines in Figures 2 and 4. On one end of the clamping bolt is a hand-wheel 55 by means of which a tight frictional engagement between the slide and the carriage, and between the tool-head and the slide may be obtained.

With this construction it may be assumed that it is desired to cut a thread T in the work 4, the thread having a starting point P spaced axially from the face F of the work and having a point of termination P' so located as to provide any desired number of continuous revolutions or any desired length in a given portion of an interrupted thread. Having determined the desired pitch of the thread T, the head 42 will be adjusted to incline the tool-arbor 47 at such a degree to the axis of rotation of the work 4 as to permit the tool 47a to cut a thread of the desired shape. Since the inclination of the cutter corresponds to the angularity or pitch of the thread, a uniform cutting action on both the leading and trailing faces of the thread is obtained in a manner not possible with a cutting tool, the cutting plane of which is not parallel to the plane of the thread at any given portion.

It will be apparent to those skilled in the art that since the cutter may be continuously rotated, it is possible to start a thread having a desired depth and continuously maintain this depth during the rotation of the work by suitably controlling the relative speeds of the cutter and work. It is also possible to discontinue the cutting operation at any point and again commence the cutting operation at any other point for the production of an interrupted thread.

The advantages of the present invention are inherent in a machine capable of operating to produce the results herein contemplated, and more particularly from the provision of a cutting attachment of such nature that a rotating cutting tool is provided with possibility of adjustment thereof in a generally axially direction, in a generally transverse direction and in a generally angular direction.

Many changes not herein specifically shown will suggest themselves to those skilled in the art in view of the disclosure of the present application, it being understood that the claims are not to be construed as limited to such disclosure.

I claim—

1. In a thread cutting attachment, a support, a carriage movable relatively thereto and carried thereby, a slide movable relatively to the carriage and carried thereby, means projecting through said support and operatively connected to the carriage for effecting movement thereof, means projecting through the support and operatively connected to the slide for effecting movement thereof, and a tool head carried by said slide and angularly adjustable relative thereto.

2. In a thread cutting machine, a revoluble work holder, a support intersecting the axis of rotation of said holder and movable toward and from said holder, a carriage carried by said support and movable transversely in a plane containing said axis, a slide on said carriage movable lengthwise of said axis and in the plane thereof, and a rotary thread cutter carried by said slide, there being means for effecting angular adjustment of said cutter relatively to said slide.

3. In a thread cutting machine, a revoluble work holder, a slide having spaced supports normally positioned on opposite sides of the axis of rotation of said work holder, a tool head carried between said supports and angularly adjustable thereon, and a motor carried by said head intermediate said supports.

4. In a thread cutting machine, a revoluble work holder, a slide having spaced supports normally positioned on opposite sides of the axis of rotation of said work holder, a tool head carried between said supports and angularly adjustable thereon, and a motor carried by said head intermediate said supports, there being means for effecting movement of said slide transversely of said axis.

5. In a thread cutting machine, a revoluble work holder, a slide having spaced supports normally positioned on opposite sides of the axis of rotation of said work holder, a tool head carried between said supports and angularly adjustable thereon, and a motor carried by said head intermediate said supports, there being means for effecting movement of said slide longitudinally of said axis.

6. In a thread cutting machine, a revoluble work holder, a slide having spaced supports normally positioned on opposite sides of the axis of rotation of said work holder, a tool head carried between said supports and angularly adjustable thereon, and a motor carried by said head intermediate said supports, there being means for effecting movement of said slide transversely and longitudinally of said axis.

7. In a thread cutting attachment, a support, a carriage movable relatively thereto and carried thereby, a slide movable relatively to the carriage and carried thereby, means projecting through said support and operatively connected to the carriage for effecting movement thereof, means projecting through the support and operatively connected to the slide for effecting movement thereof, said slide including opposed spaced side portions, and a tool head carried by said slide intermediate said spaced side portions.

8. In a thread cutting attachment, a support, a carriage movable relatively thereto and carried thereby, a slide movable relatively to the carriage and carried thereby, means projecting through said support and operatively connected to the carriage for effecting movement thereof, means projecting through the support and operatively connected to the slide for effecting movement thereof, said slide including opposed spaced side portions, and a tool head carried by said slide intermediate said spaced side portions and angularly adjustable relatively thereto.

9. In a machine of the character defined, a bed plate, a support carried thereby and movable longitudinally thereof, a carriage movably carried by said support, means extending through the support for moving the carriage, a slide movably carried by said carriage, means extending through the support for moving said slide, and a tool head adjustably carried by said slide for angular adjustment relatively thereto.

10. In a machine of the character defined, a bed plate, a support carried thereby and movable longitudinally thereof, a carriage movably carried by said support, means extending through the support for moving the carriage, a slide movably carried by said carriage, means extending through the support for moving said slide, and a tool head adjustably carried by said slide for angular adjustment relatively thereto, both of said means comprising substantially parallelly extending shafts.

11. In a machine of the character defined, a bed plate, a support carried thereby and movable longitudinally thereof, a carriage movably carried by said support, means extending through the support for moving the carriage, a slide movably carried by said carriage, means extending through the support for moving said slide, and a tool head adjustably carried by said slide for angular adjustment relatively thereto, both of said means comprising substantially parallelly extending shafts one of which includes a plurality of relatively telescopic sections.

12. In a thread cutting attachment, a tool head, coaxial arcuate guideways for supporting said head and permitting angular adjustment thereof, said guideways being spaced along the common axis of the arcs thereof, and a motor carried by said head for driving a tool therein.

13. In a thread cutting attachment, a tool head, a pair of coaxial arcuate guideways for supporting said head and permitting angular adjustment thereof, said guideways being spaced along the common axis of the arcs thereof, and means for driving a tool in said head.

14. In a cutting attachment, a slide provided with a pair of coaxial arcuate guideways spaced along their common axis, a tool head supported by said slide and angularly adjustable by movement along said guideways, said tool head including a tool arbor disposed intermediate said guideways, a driving motor for said arbor carried by said head with its axis offset from and parallel to the axis of the tool arbor, and a rectilinearly movable carriage for the slide, said slide being movable relative to the carriage transversely to the direction of movement of the carriage.

In testimony whereof I have hereunto set my hand.

FRED W. GARRISON.